US012714980B2

(12) United States Patent
Hernandez-Maldonado et al.

(10) Patent No.: US 12,714,980 B2
(45) Date of Patent: Aug. 25, 2026

(54) NANOPOROUS PURE SILICA ZEOLITES

(71) Applicant: University of Puerto Rico, Mayagüez, PR (US)

(72) Inventors: Arturo Hernandez-Maldonado, Mayagü ez, PR (US); Zhongfang Chen, Mayagü ez, PR (US); Rodinson Arrieta-Perez, Mayagü ez, PR (US); Daniela Rivera-Mirabal, Mayagü ez, PR (US); Gabriela Del Valle-Perez, Mayagü ez, PR (US); Yinghe Zhao, Mayagü ez, PR (US); Shiru Lin, Mayagü ez, PR (US); Dariana Vega-Santander, Mayagü ez, PR (US)

(73) Assignee: University of Puerto Rico, Mayagüez, PR (US)

( * ) Notice: Subject to any disclaimer, the term of this patent is extended or adjusted under 35 U.S.C. 154(b) by 424 days.

(21) Appl. No.: 18/258,105

(22) PCT Filed: Dec. 17, 2021

(86) PCT No.: PCT/US2021/064148
§ 371 (c)(1),
(2) Date: Jun. 16, 2023

(87) PCT Pub. No.: WO2022/133279
PCT Pub. Date: Jun. 23, 2022

(65) Prior Publication Data

US 2024/0033708 A1 Feb. 1, 2024

Related U.S. Application Data

(60) Provisional application No. 63/127,528, filed on Dec. 18, 2020.

(51) Int. Cl.
*B01J 20/18* (2006.01)
*B01J 20/28* (2006.01)
(Continued)

(52) U.S. Cl.
CPC ......... *B01J 20/18* (2013.01); *B01J 20/28061* (2013.01); *B01J 20/28064* (2013.01);
(Continued)

(58) Field of Classification Search
CPC B01J 20/18; B01J 20/28057; B01J 20/28061; B01J 20/28064; B01J 20/2808;
(Continued)

(56) References Cited

U.S. PATENT DOCUMENTS

| | | | | |
|---|---|---|---|---|
| 6,488,741 | B2 | 12/2002 | Olson | |
| 8,784,535 | B2 * | 7/2014 | Ravikovitch | C10L 3/104 95/143 |
| 2016/0279597 | A1 | 9/2016 | Shigeta et al. | |

OTHER PUBLICATIONS

Wessels et al. "An Ordered Form of the Extra-Large-Pore Zeolite UTD-1: Synthesis and Structure Analysis from Powder Diffraction Data" Journal of the American Chemical Society. Jun. 17, 1999.pp. 6242-6247. (Year: 1999).*

(Continued)

*Primary Examiner* — Latosha Hines
(74) *Attorney, Agent, or Firm* — McDonnell Boehnen Hulbert & Berghoff LLP

(57) ABSTRACT

This disclosure relates to nanoporous pure silica zeolite (PSZ) adsorbents and uses thereof.

4 Claims, 10 Drawing Sheets

(51) Int. Cl.
*B01J 20/30* (2006.01)
*B01J 20/34* (2006.01)
*C02F 1/28* (2023.01)
*C02F 101/34* (2006.01)

(52) U.S. Cl.
CPC ....... *B01J 20/2808* (2013.01); *B01J 20/3057* (2013.01); *B01J 20/3085* (2013.01); *B01J 20/3433* (2013.01); *B01J 20/3458* (2013.01); *C02F 1/281* (2013.01); *C02F 2101/34* (2013.01); *C02F 2303/16* (2013.01)

(58) Field of Classification Search
CPC ......................... B01J 20/3057; B01J 20/3085; B01J 20/3433; B01J 20/3458; C02F 1/281; C02F 2101/34; C02F 2303/16
See application file for complete search history.

(56) References Cited

OTHER PUBLICATIONS

Zi et al. "Designed synthesis of an extra-large pore zeolite with a 14-membered ring channel via supramolecular assembly templating approach." Zi et al. Microporous and Mesoporous Materials. Aug. 14, 2019. pp. 1-6. (Year: 2019).*
Freyhardt et al. "A high-silica zeolite with a 14-tetrahedral-atom pore opening" Nature. May 23, 1996. pp. 295-298. (Year: 1996).*
The International Search Report for International Application No. PCT/US2021/64148 mailed May 4, 2022.

* cited by examiner

NANOPOROUS PURE SILICA ZEOLITES

CROSS-REFERENCE TO RELATED APPLICATIONS

This application is a national stage application under 35 U.S.C. § 371 of International Application No. PCT/US2021/064148 filed Dec. 17, 2021, which claims the benefit of priority of U.S. Provisional Application No. 63/127,528, filed Dec. 18, 2020, each of which is incorporated herein by reference in its entirety.

STATEMENT REGARDING FEDERALLY SPONSORED RESEARCH

The claimed invention was made with U.S. Government support under grant number 80NSSC17M0047 awarded by the National Aeronautics and Space Administration (NASA). The government has certain rights in this invention.

BACKGROUND OF THE DISCLOSURE

Field of Invention

The present invention relates to the removal of siloxanes from (liquid) water. In particular, it relates to the use of zeolites for the removal of siloxanes via adsorption.

Technical Background

Siloxanes refer to a class of silicones derivatives containing Si—O bonding (Pedrouzo et al., 2011) and are classified into linear and cyclic compounds. Among others, siloxanes are widely used are used in many industries and consumer products, including oil production (Zhi et al., 2018a), dry cleaning, personal care products (Velicogna et al., 2012), and the manufacturing of higher weight silicon polymers (Rauert et al., 2018). In 2018, the world sale volume of siloxanes reached approximately 2.8 million tonnes. Monomethylsilanetriol (MMST) (Tuazon et al., 2000), trimethylsilanol (TMS), and dimethylsilanediol (DMSD) (Rutz et al., 2011) are linear methyl-siloxanes, which are commonly found after the hydrolysis of other siloxanes. Sulfuration of siloxanes can also lead to derivative species like dimethylsulfone ($DMSO_2$) (Rector et al., 2014). Due to high vapor pressure, siloxanes and their derivatives are persistent and subject to bio-accumulation (Coggon et al., 2018; Krogseth et al., 2013; Sanchis et al., 2015; Wang et al., 2018; Xu et al., 2017; Zhi et al., 2018b), making it challenging to remove them from various environmental media (Bletsou et al., 2013; Genualdi et al., 2011; Hong et al., 2014; Sinchez-Brunete et al., 2010; Sparham et al., 2008). Furthermore, siloxanes and their derivatives have potential toxicity (Sousa et al., 1995) and, when in the soil, can cause adverse effects in some animal and plant species (Velicogna et al., 2012).

In closed-volume environments where siloxanes are ubiquitous (Carter et al., 2015a; Carter et al., 2015c; Rector et al., 2014), such as habitats designed for long-term human activities like the International Space Station (ISS), remediation is critical since the crew depends on water reclamation for life support. Though water recycling is not necessary for short-term missions in which water on transit spacecraft usually is produced by fuel cells and then stored, the same does not necessarily apply for habitats like the ISS, where electricity can be primarily produced by solar panels. Furthermore, due to the high cost associated with payload transport, water-recycling systems are cost effective for lunar outposts and even Mars transit vehicles where missions will last from months to years.

Reclaiming water in portable and closed-volume applications is certainly not an easy task, particularly in space missions where limits to weight and volume are mandatory (Carter et al., 2015c). Reclaiming in a closed-loop environment also brings many challenges associated with achieving high purity water, particularly when taking into account problematic compounds such as siloxanes. The siloxanes or siloxane derivatives frequently observed in the ISS are MMST, DMSD, TMS, and $DMSO_2$. The last one is primarily generated in the ISS Urine Processor Assembly due to the reaction of sulfuric acid with organics in crew urine (Carter et al., 2015a; Rector et al., 2014; Rutz et al., 2011). All of these contaminants could be toxic to humans if ingested for long periods of time even at low concentrations (i.e., mg $L^{-1}$) (Amanathan et al., 2012) and, therefore, finding an efficient method for removing siloxanes is necessary.

Developing suitable adsorbents could be a cost-effective solution to the notorious siloxane removal problem in both terrestrial and space exploration applications (Liu et al., 2019). Along those lines, various adsorbents, such as ion exchange resin (Ajhar et al., 2010; Carter et al., 2015b), and activated carbon (Cabrera-Codony et al., 2014; Tan et al., 2019; Wang et al., 2015) have been explored, but their adsorption abilities are far from satisfactory due to low affinity (Ortega and Subrenat, 2009). Therefore, it is of paramount importance to search for high-performance adsorbent materials to remove siloxanes effectively.

BRIEF SUMMARY OF THE DISCLOSURE

The present disclosure is directed to zeolites that can be used to adsorb siloxanes and siloxane derivatives.

In a first aspect, the present disclosure provides a nanoporous pure silica zeolite (PSZ) adsorbent that has a chemical framework composition comprising $Si_{64}O_{128}$, wherein the nanoporous PSZ adsorbent comprises a DON phase.

In one embodiment of the first aspect, the nanoporous PSZ adsorbent has a surface area of about 400 $m^2 g^{-1}$. In one embodiment of the first aspect, the nanoporous PSZ adsorbent has an average pore size of about 12 Å. In one embodiment of the first aspect, the nanoporous PSZ adsorbent has thermal stability up to about 600° C. In another embodiment of the first aspect, the PSZ adsorbent was prepared using bis(pentamethyl-cyclopentadienyl), cobalt (III) hydroxide $(((Cp^*)_2Co)OH)$ as a structure directing agent.

In a second aspect, the present disclosure provides a filter that has a) a substrate and b) a nanoporous PSZ adsorbent associated with the substrate. The nanoporous PSZ adsorbent includes a chemical framework composition comprising $Si_{64}O_{128}$, and the PSZ adsorbent comprises a DON phase. In one embodiment of the second aspect, the substrate includes a housing, and the nanoporous PSZ adsorbent is contained within the housing.

In a third aspect, the present disclosure provides a method of removing a siloxane contaminant from a substance. The method includes a) providing a nanoporous PSZ adsorbent; b) contacting the substance to the nanoporous PSZ adsorbent, wherein the substance includes a siloxane contaminant; and c) removing the siloxane contaminant from the substance by adsorption to the nanoporous PSZ adsorbent.

In one embodiment of the third aspect, the nanoporous PSZ adsorbent comprises a chemical framework composition comprising $Si_{64}O_{128}$. In one embodiment of the third aspect, the nanoporous PSZ adsorbent comprises a DON phase. In another embodiment of the third aspect, the nanoporous PSZ adsorbent has a surface area of about 400 $m^2 g^{-1}$. In one embodiment of the third aspect, the nanoporous PSZ adsorbent has an average pore size of about 12 Å. In one embodiment of the third aspect, the nanoporous PSZ adsorbent has thermal stability up to about 600° C. In another embodiment of the third aspect, the substance is an aqeuous substance. In another embodiment of the third aspect, the siloxane contaminant comprises one or more of TMS, MMST, DMSD, and/or $DMSO_2$. In another embodiment of the third aspect, up to about about 3 wt. % TMS is adsorbed from the substance.

In a fourth aspect, the present disclosure provides a method of removing a siloxane contaminant from a substance. The method includes a) providing a nanoporous PSZ adsorbent; b) contacting the substance to the nanoporous PSZ absorbent, wherein the substance comprises a siloxane contaminant; c) removing the siloxane contaminant from the substance by adsorption to the nanoporous PSZ adsorbent; and d) regenerating the nanoporous PSZ adsorbent.

In one embodiment of the fourth aspect, the nanoporous PSZ adsorbent is regenerated by treating the nanoporous PSZ adsorbent using a pH swing to change the adsorbent surface charge and produce desorption. In one embodiment of the fourth aspect, the nanoporous PSZ adsorbent is regenerated by heating the nanoporous PSZ adsorbent to a temperature above the melting point of the adsorbed siloxanes but below the thermal stability point of the adsorbent structure. In one embodiment of the fourth aspect, regeneration of the nanoporous PSZ adsorbent occurs within a period ranging from 0.1 h to 96 h.

These and other features and advantages of the present invention will be more fully understood from the following detailed description taken together with the accompanying claims. It is noted that the scope of the claims is defined by the recitations therein and not by the specific discussion of features and advantages set forth in the present description.

DETAILED DESCRIPTION

Figure 1:
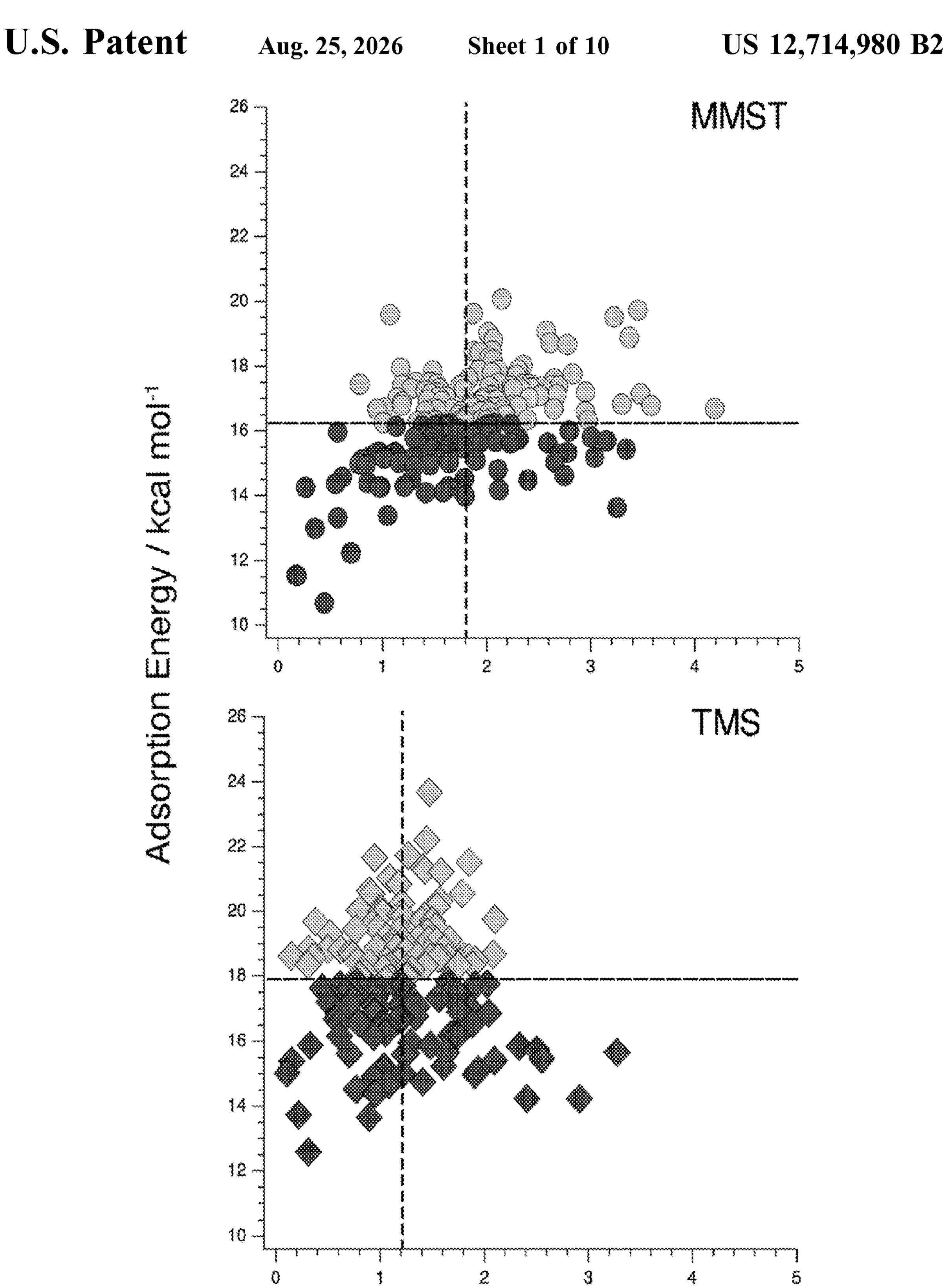
FIG. 1. The average adsorption energy and loading values of PSZs towards four siloxanes or siloxane derivatives. The points at which the dotted lines cross represent average adsorption energy and loading for each data set. Markers shown in gray represent zeolites that exhibited adsorption energies and loadings above average. MMST—monomethylsilanetriol, DMSD—dimethylsilanediol, TMS—trimethylsilanol, $DMSO_2$—dimethylsulfone.
Figure 1:
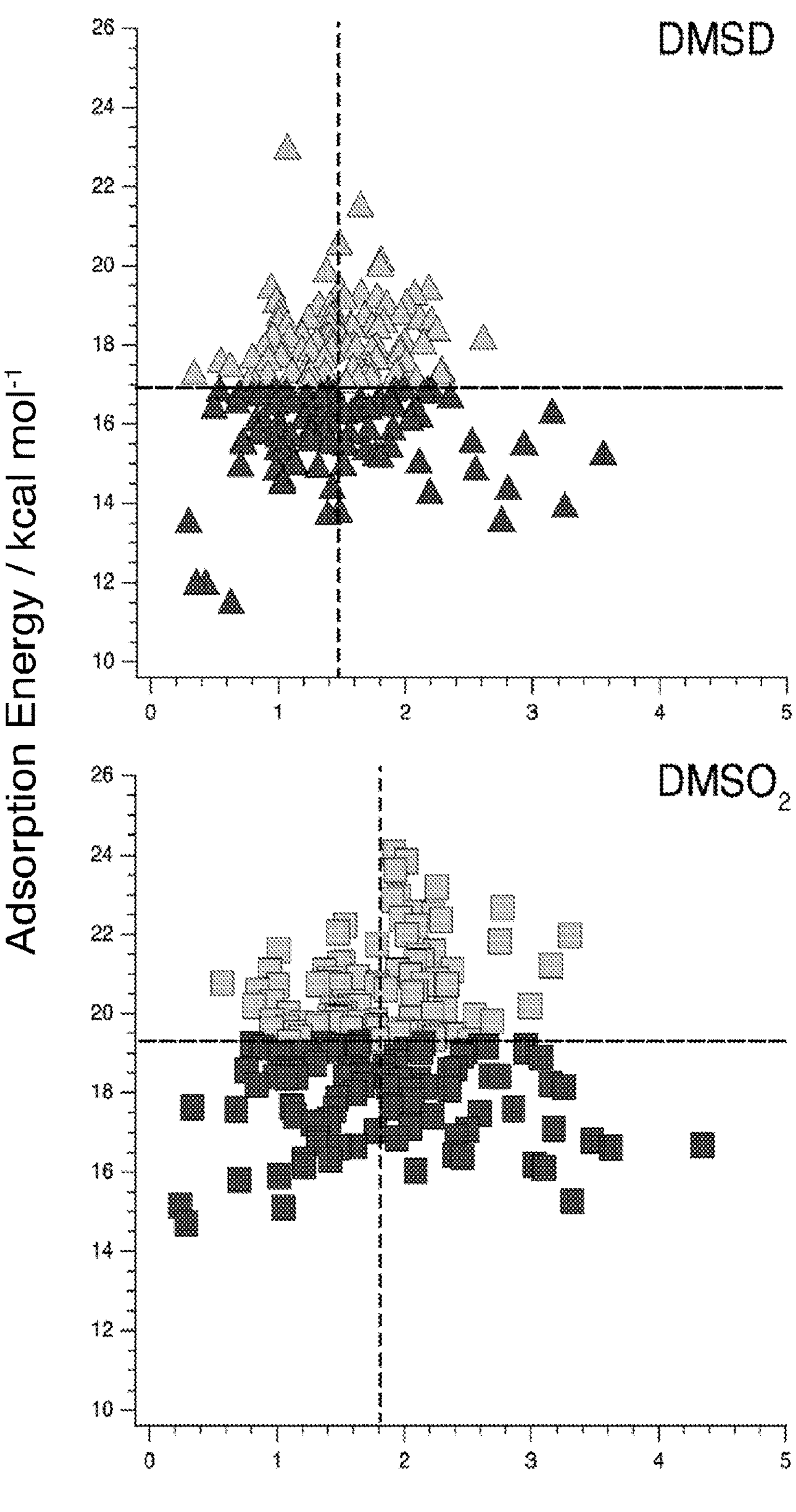

It is to be understood that the particular aspects of the specification are described herein are not limited to specific embodiments presented, and can vary. It also will be understood that the terminology used herein is for the purpose of describing particular aspects only and, unless specifically defined herein, is not intended to be limiting. Moreover, particular embodiments disclosed herein can be combined with other embodiments disclosed herein, as would be recognized by a skilled person, without limitation.

Throughout this specification, unless the context specifically indicates otherwise, the terms "comprise" and "include" and variations thereof (e.g., "comprises," "comprising," "includes," and "including") will be understood to indicate the inclusion of a stated component, feature, element, or step or group of components, features, elements or steps but not the exclusion of any other component, feature, element, or step or group of components, features, elements, or steps. Any of the terms "comprising", "consisting essentially of", and "consisting of" may be replaced with either of the other two terms, while retaining their ordinary meanings.

As used herein, the singular forms "a," "an," and "the" include plural referents unless the context clearly indicates otherwise.

Percentages disclosed herein can vary in amount by ±10, 20, or 30% from values disclosed and remain within the scope of the contemplated disclosure.

Unless otherwise indicated or otherwise evident from the context and understanding of one of ordinary skill in the an, values herein that are expressed as ranges can assume any specific value or sub-range within the stated ranges in different embodiments of the disclosure, to the tenth of the unit of the lower limit of the range, unless the context clearly dictates otherwise.

As used herein, ranges and amounts can be expressed as "about" a particular value or range. About also includes the exact amount. For example, "about 5%" means "about 5%" and also "5%." The term "about" can also refer to ±10% of a given value or range of values. Therefore, about 5% also means 4.5%-5.5%, for example.

As used herein, the terms "or" and "and/or" are utilized to describe multiple components in combination or exclusive of one another. For example, "x, y, and/or z" can refer to "x" alone, "y" alone, "Z" alone, "x, y, and z," "(x and y) or z," "x or (y and z)," or "x or y or z."

Overview

Zeolites possess outstanding structural advantages as adsorbent materials due their surface chemistry. For zeolites that contain merely silicon and oxygen atoms, also known as pure silica zeolites (PSZs), their frameworks are highly hydrophobic and without acid sites. Thus, the competitive adsorption of water, which contains high concentrations of cations, would be significantly reduced (Pham et al., 2014). Moreover, zeolites are thermally stable and can be easily regenerated when their pores are saturated with adsorbates (Olson et al., 2004; Palomino et al., 2007; Zhu et al., 2000).

It should be noted that there are numerous possible zeolites and screening these one by one as promising candidates for siloxane removal is not practical, if not impossible. However, Grand canonical Monte Carlo (GCMC) simulation methods can be used to simplify and expedite the screening.

As used herein, the pure silica zeolites are understood to be substantially formed only from silicon and oxygen in an approximately 2:1 atomic ratio. Accordingly, in certain embodiments as otherwise described herein, no more than 10 at % of the PSZ is comprised of elements besides silicon and oxygen. For example, in particular embodiments, no more than 5 at % (e.g., no more than 3 at %, or 1 at %, or 0.1 at %) of the PSZ is comprised of elements besides silicon and oxygen. In certain embodiments, surface hydroxyl groups will result in small amount of hydrogen content in the PSZ. Accordingly, in those embodiments, no more than 10 at % (e.g., no more than 5 at %, or 3 at %, or 1 at %, or 0.1 at %) of the PSZ is comprised of elements besides silicon, oxygen and hydrogen. It will be understood that the atomic purity of the PSZ refers to covalently bonded species, and does not include adsorbed species such as $H_2O$. In particular embodiments, the PSZ contains substantially no (e.g., less than 5 at %, or less than 1 at %, or an undetectable amount) of Zr, Al, Zn, Mg, Ca, P, or Na.

The present inventors have determined that the DON zeolite phase is ideal for siloxane adsorption desorption. Accordingly, in certain embodiments as otherwise described herein, the nanoporous PSZ adsorbent comprises a DON phase. For example, in particular embodiments, the PSZ adsorbent comprises no more than 10% other crystalline phases, e.g., no more than 5%, or 3%, or 1% other crystalline phases. In some embodiments, no other crystalline phase is detectable through methods conventional in the art, such as powder x-ray diffraction.

Provided herein are zeolites for the adsorption of siloxanes and siloxane derivatives from the environment. In some embodiments, zeolites of the present disclosure can adsorb siloxanes and derivatives thereof from fluid phases, such as water and air. Adsorption can occur at various temperatures, including, for example at ambient temperature (e.g., about 25° C.) or at temperatures near or below the boiling point of the liquid solvent where the siloxanes reside.

Exemplary zeolites contemplated herein include pure silica zeolites (PSZs), though other zeolites are also contemplated herein. In some embodiments, PSZs can have pore sizes anywhere within the micropore and mesopore range (from about 20 Å to about 500 Å) and could be prepared or modified to include silanol groups (i.e., OH sites) to enhance their potential for capturing siloxanes from fluid media. PSZs with structural faulting that leads to the formation of silanols display considerable adsorption capacity toward certain linear siloxanes.

Accordingly, in certain embodiments as otherwise described herein, the nanoporous PSZ adsorbent comprises an average pore size in the range of 5 Å to 20 Å. For example, in particular embodiments, the nanoporous PSZ adsorbent comprises an average pore size in the range of 6 Å to 18 Å, e.g., 8 Å to 16 Å, or 10 Å to 14 Å, or about 12 Å.

Advantageously, the PSZ adsorbent as described herein has a high surface area. Accordingly, in certain embodiments, the nanoporous PSZ adsorbent may comprise a surface area of about 400 $m^2 g^{-1}$. Accordingly, in particular embodiments, the nanoporous PSZ adsorbent comprises a surface area of 250 $m^2 g^{-1}$ to 600 $m^2 g^{-1}$. For example, in some embodiments, the PSZ adsorbent comprises a surface area of 250 $m^2 g^{-1}$ to 550 $m^2 g^{-1}$, e.g., 250 $m^2 g^{-1}$ to 500 $m^2 g^{-1}$, or 250 $m^2 g^{-1}$ to 450 $m^2 g^{-1}$, or 300 $m^2 g^{-1}$ to 600 $m^2 g^{-1}$, or 350 $m^2 g^{-1}$ to 600 $m^2 g^{-1}$, or 300 $m^2 g^{-1}$ to 500 $m^2 g^{-1}$, or 350 $m^2 g^{-1}$ to 450 $m^2 g^{-1}$.

Filters

Zeolites that exhibit selectivity toward siloxanes and derivatives thereof can be used as the main, active component of fixed bed type filters for deployment in scenarios such as continuous flow water treatment systems, including those capable of handling large scale purification of water (i.e., water treatment plants) and consumer level scale systems (i.e., in line water purification systems for home applications). These zeolites can also be prepared in membrane form for removal of siloxanes based on nanofiltration, ultrafiltration, and/or osmosis. Furthermore, the siloxane selective zeolites can be employed for the development of sensing applications, with systems based on or combined with zeolitic thin films and other appropriate forms or shapes. In some embodiments, a zeolite can form the active component in the sensing element, which can produce a signal upon adsorbing a siloxane from water based on chemical changes on its surface (e.g., a change in zeolitic structure upon adsorbing a siloxane can be translated into a detectable signal). Detection of changes in zeolitic structure can be accomplished by various means as are appreciated by a person of skill in the art. For example, siloxane adsorption by a contemplated zeolite can be measured, for example, by sensing a change in adsorption energy leading to a measurable temperature change. In some embodiments, devices are contemplated herein that incorporate such zeolite sensing elements and can be used to detect the presence of siloxanes in fluids, such as drinking water. In some embodiments, such devices can combine zeolite filters and zeolite sensors.

Figure 8:
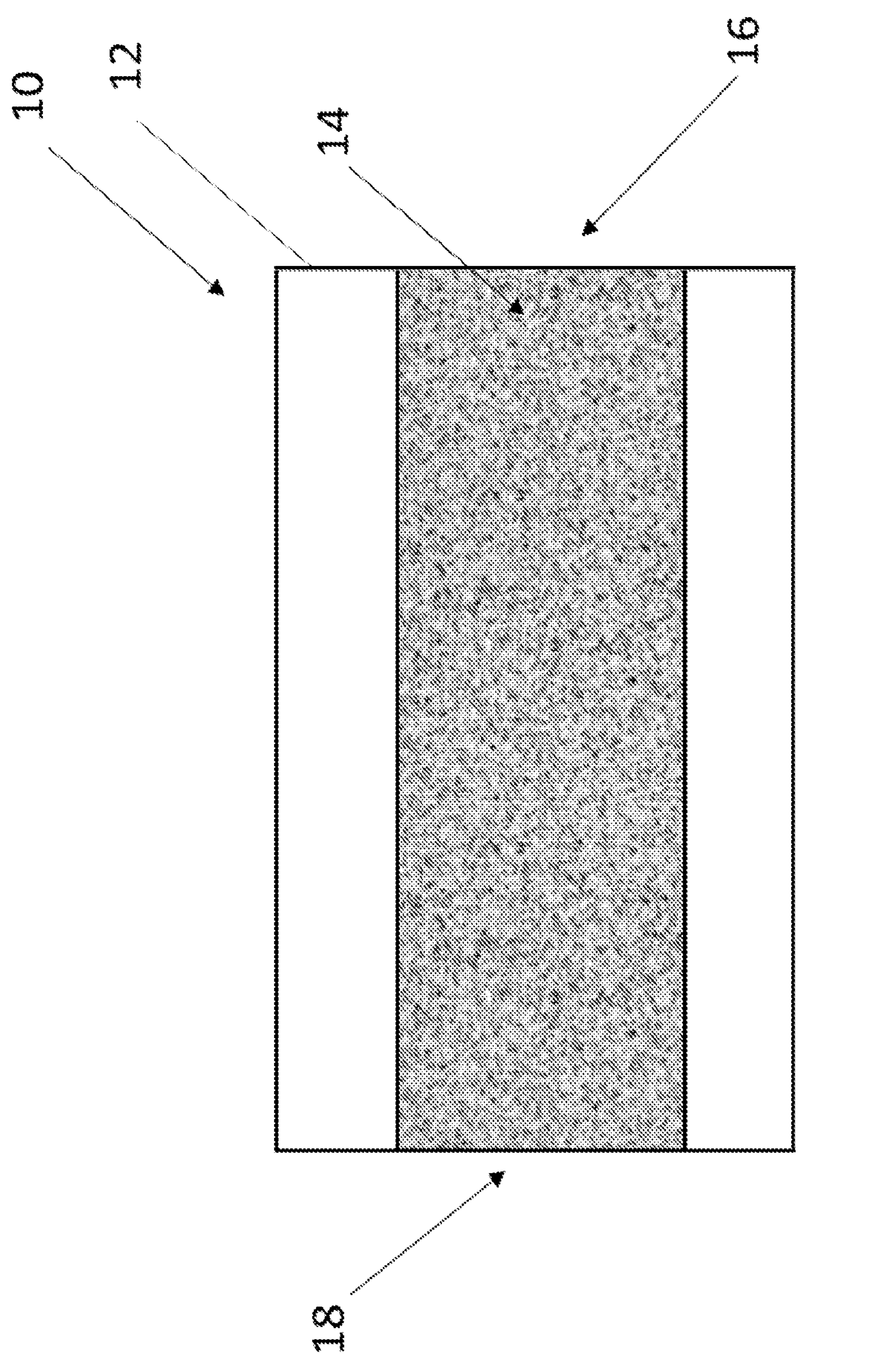
FIG. 8. Schematic of a contemplated filter according to one embodiment.

In some embodiments, one or more filters containing a PSZ adsorbent are contemplated. For example, a contemplated filter 10 is shown in FIG. 8. The filter 10 includes a substrate 12, which can be a two-dimensional solid or flexible structure or a three-dimensional structure or housing. The filter 10 further includes a PSZ adsorbent 14 that is permanently or removably affixed to the substrate 12. The filter 10 can further include area 16 that can serve as an opening into a housing to allow entry of a substance to be filtered and an area 18 that can serve as an exit for the filtered substance.

Reclamation Systems

Reclamation systems (e.g., water reclamation systems) are contemplated herein that incorporate one or more zeolite filters, such as those that can be employed in closed or limited environment systems, for example, those used in water-poor environments or in space applications. In some embodiments, siloxanes adsorbents can be incorporated into reclamations systems in filter form, as described herein elsewhere. In some embodiments, contemplated zeolite filters containing PSZ adsorbents form part of a train chain of water treatment steps. In some embodiments, such siloxane adsorption filters are located strategically within the chain. For instance, as a polishing stage at the very end of the train, or at a place following the contaminant point source (e.g., in the case of space applications).

Methods

In some embodiments, methods of removing siloxanes and derivatives thereof from water include contacting a zeolitic adsorbent with a volume of water either in batch or flow fashion. When used in batch processing, a method of removing siloxanes and derivatives thereof can include mixing of the adsorbent particles (in pellet or any other appropriate form) with a particular amount of water containing one or more siloxane and/or siloxane derivatives at a given concentration. This batch process can include contacting both the solid and liquid phases for a given amount of time (e.g., 1, 2, 3, 4, 5, 6, 7, 8, 9, 10, 12, 24, 36, 48, 72, or 96 hours or more), followed by a solid phase separation step (i.e., precipitation, centrifugation, etc.) to recover the purified water. For flow systems, a fixed bed approach could be used. In such systems, the adsorbent solid particles can be packed into a given volume (i.e., a cylindrical column or any other desired volume). This bed can then be contacted by a water flow that contains a given concentration of one or more siloxanes and/or siloxane derivatives. The bed can be used for filtration purposes until determined to be exhausted, which occurs when the effluent siloxanes or siloxane derivatives concentration(s) matches that of the bed inlet. Once a bed is determined to be exhausted, the bed can be replaced with a fresh bed, and the exhausted bed can be regenerated.

Methods of Regenerating PSZs

Most zeolite materials are thermally stable and this can be advantageous for potential thermally based regeneration after the materials are determined to be exhausted (i.e., once the materials have reached their maximal potential for adsorption of siloxanes and/or derivatives thereof). PSZ UTD-1 (DON), for instance, is stable to at least 1000° C. Therefore, this material can be regenerated via thermal cycling under a flow of air or any other suitable gas after being exhausted with the uptake of siloxanes. In some embodiments, a temperature of about 250° C. can be used to desorb $DMSO_2$, while a much lower temperature range (about 200° C.) can be used to eliminate linear siloxanes like MMST, DMSD, and TMS.

Figure 9:
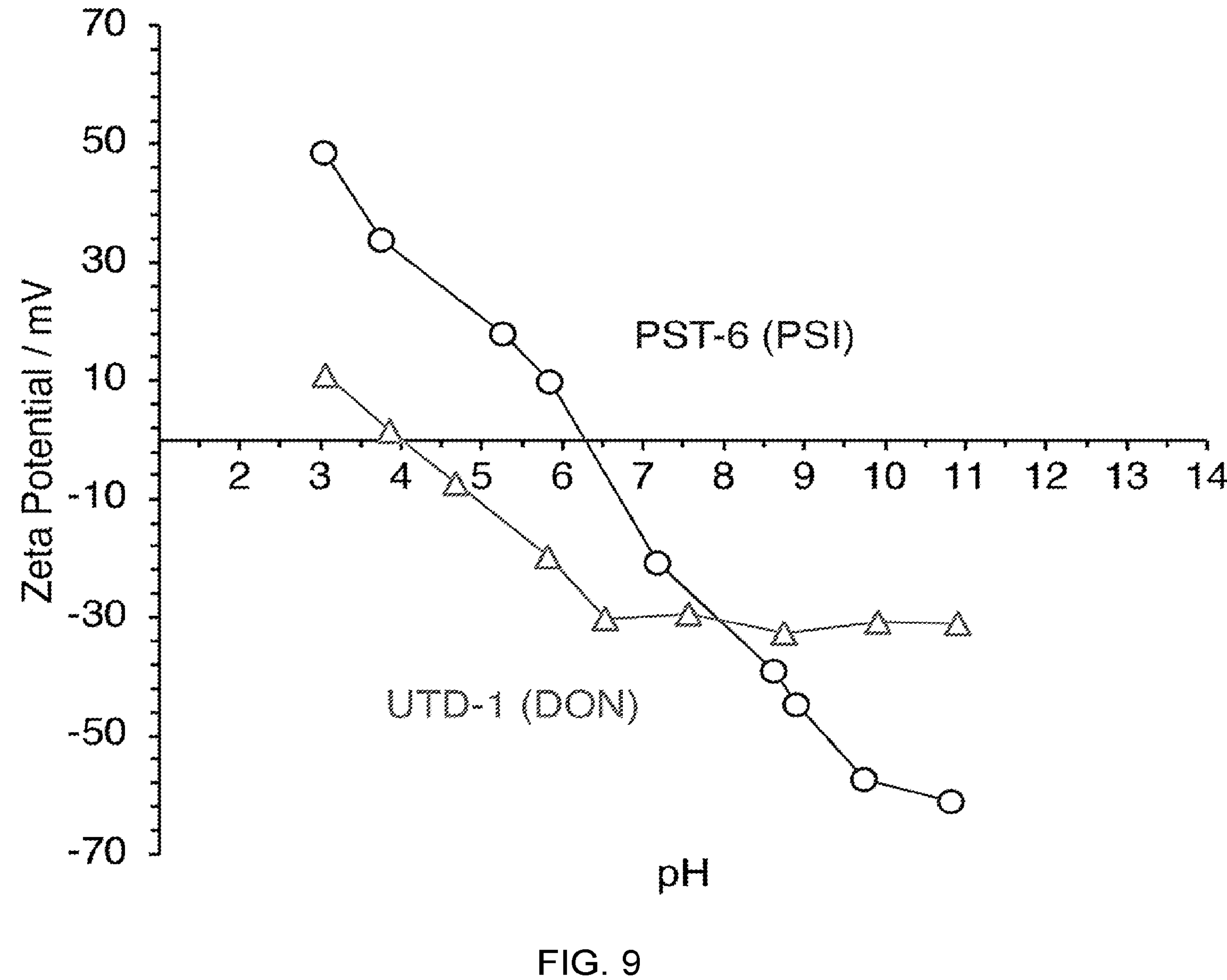
FIG. 9. Zeta potential profiles for UTD-1 (DON) and PST-6 (PSI).

Another contemplated regeneration strategy includes removal of siloxanes and/or derivatives thereof from contemplated adsorbents by exposing the adsorbents to changes in pH. Based on Zeta potential measurements (see FIG. 9), acidic conditions change the adsorbent surface charge to positive; furthermore, the added protons would interact with the OH groups of the structure of materials like UTD-1, favoring the regeneration of the material. Also, it is important to state that the material structure and performance would not be affected by acidic conditions, since UTD-1 is already subjected to acidic conditions during its synthesis.

The nanoporous PSZ adsorbents as described herein advantageously possess excellent thermal stability. This is important as it allows facile siloxane desorption without degradation of the underlying PSZ adsorbent. Accordingly, in certain embodiments as otherwise described herein, the nanoporous PSZ adsorbent comprises thermal stability up to a temperature of at least 450° C., e.g., of at least 500° C., or 550° C., or 600° C.

EXAMPLES

The Examples that follow are illustrative of specific embodiments of the disclosure, and various uses thereof. They are set forth for explanatory purposes only and should not be construed as limiting the scope of the disclosure in any way.

Example 1: Formation and Characterization of PSZs

Introduction

The present invention identified candidate PSZs for removal of siloxane contaminants for the environment.

Methods

Grand Canonical Monte Carlo (GCMC) simulations in the sorption module of Materials Studio 8.0 were conducted to evaluate the absorption performance of 232 randomly selected zeolites towards the linear methyl-siloxanes of monomethylsilanetriol (MMST), trimethylsilanol (TMS), and dimethylsilanediol (DMSD) and the siloxane derivative species dimethylsulfone ($DMSO_2$) (see Lin e/al., "Machine-learning-assisted screening of pure-silica zeolites for effective removal of linear siloxanes," J. Mater. Chem. A, 2020, 8, 3228). GCMC is a statistical-mechanical approach, in which the adsorption process is investigated relying on random sampling and probabilistic interpretation in the sorbent framework.

Average adsorption loading (molecules $nm^{-3}$) and adsorption energy (kcal $mol^{-1}$) were calculated, and the 10 lowest-energy adsorption geometries of each adsorption system (where more substantial adsorption loading and higher adsorption energy indicate better adsorption performances) were identified. GCMC simulations were carried out in a zeolite cell containing a section of the model pore, and each cell had a length of around 4.0 nm, which was sufficiently large to make the effect of finite system size negligible. The systems were equilibrated for 100,000 GCMC steps, and data were collected for another 1,000,000 production steps to get the average amount adsorbed. All the GCMC simulations were carried out at a temperature of 298 K and a fixed pressure of 101.33 kPa with the Metropolis Monte Carlo method and COMPASS forcefield.

Production of PSZs

PSZs were prepared via templated hydrothermal crystallization, starting with saturated gels containing the silicon and oxygen sources and a structure directing agent (SDA, many types can be used). The gels and the SDA mixtures were then placed inside Teflon lined autoclaves, sealed, and heated to a particular temperature, usually above the boiling point of the solvent medium (i.e., water). It should be noted that the heat source maybe a traditional oven or it could be based on microwave assisted heating. The preparation could last from several hours to several days. Upon full crystallization, the solids are recovered via centrifugation and/or filtration. The solids were cleaned with pure, deionized, distilled water to assist in the removal of unreacted species and impurities. The recovered solids can be dried overnight using heat sources, such as a forced convection oven.

The SDA is subsequently removed to expose the micro and/or mesoporosity of the PSZs. Its removal may be accomplished via thermal calcination and pyrolysis of the as-prepared PSZ solids. Depending on the nature of the SDA, acid or solvent treatments may be required to remove inorganic portions or residues generated during the decomposition of the SDA.

Equilibrium adsorption tests were conducted by mixing the adsorbent (i.e., PSZ) with aqueous siloxane solutions (i.e., 10-200 $L^{-1}$) inside borosilicates tubes. The tubes were shaken for a certain amount of time at neutral pH. The liquid and solid phases were separated via centrifugation, and aliquots were transferred afterward to glass vials and sealed with an open-top polypropylene closure (with PTFE/silicone lined). Tests were conducted in triplicate and the equilibrium concentration of siloxane in the liquid phase was estimated using a Total Organic Carbon (TOC) analyzer following standard procedures. The amounts of adsorbed siloxanes were calculated based on a mass balance:

$$q_e = \frac{V_i(C_i - C_e)}{m_{ads}}$$

where $q_e$ is the siloxane adsorbed amount (mg $g^{-1}$), $C_i$ is the initial siloxane concentration in solution (mg $L^{-1}$), and $C_e$ is the concentration of siloxane at equilibrium (mg $L^{-1}$), $V_i$ is the liquid volume of the siloxane solution (L), and $m_{adx}$ is the mass of the adsorbent (g).

Results

FIG. 1 shows adsorption energy versus adsorption loading profiles for various PSZs as calculated from Grand Canonical Monte Carlo (GC-MC) simulations. A total of 232 zeolitic materials were tested and Table No. 1 lists them by the crystal topology three-letter code assigned by the International Zeolite Association. Table No. 2 lists the framework topologies of zeolites that exhibited above average adsorption energies and loadings for at least two of the siloxane contaminants evaluated (i.e., MMST, DMSD, TMS, and $DMSO_2$).

TABLE NO. 1

| Topology codes of tested PSZs. | | | | | | | | |
|---|---|---|---|---|---|---|---|---|
| ABW | ACO | AEI | AEL | AEN | AET | AFG | AFI | AFN |
| AFO | AFR | AFS | AFT | AFV | AFX | AFY | AHT | ANA |
| APC | APD | AST | ASV | ATN | ATO | ATS | ATT | ATV |
| AVL | AWO | AWW | BCT | BEA | BEC | BIK | BOF | BOG |
| BOZ | BPH | BRE | BSV | CAN | CAS | CDO | CFI | CGF |
| CGS | CHA | CHI | CLO | CON | CSV | CZP | DAC | DDR |
| DFO | DFT | DOH | DON | EAB | EDI | BEI | EMT | EON |
| EPI | ERI | ESV | ETL | ETR | EUO | EWT | EZT | FAR |
| FAU | FER | FRA | GIS | GIU | GME | GON | GOO | HEU |
| IFO | IFR | IFU | IFW | IFY | IHW | IMF | IRN | IRR |
| IRY | ISV | ITE | ITG | ITH | ITN | ITR | ITT | ITV |
| ITW | IWR | IWS | IWV | IWW | JBW | JNT | JOZ | JRY |
| JSN | JSR | JST | JSW | KFI | LAU | LEV | LIO | LIT |
| LOS | LOV | LTA | LTF | LTJ | LTL | LTN | MAR | MAZ |
| MEI | MEL | MEP | MER | MFI | MFS | MON | MOR | MOZ |
| MRE | MSE | MSO | MTF | MTN | MTT | MTW | MVY | MWF |
| MWW | NAB | NAT | NES | NON | NPO | NPT | NSI | OBW |
| OFF | OKO | OSI | OSO | OWE | PAR | PAU | PCR | PHI |
| PON | POS | PSI | PUN | RHO | RON | RRO | RSN | RTE |
| RTH | RUT | RWR | RWY | SAF | SAO | SAS | SAT | SAV |
| SBE | SBN | SBS | SBT | SEW | SFE | SFF | SFG | SFH |
| SFN | SFO | SFS | SFV | SFW | SGT | SIV | SOD | SOF |
| SOS | SSF | SSO | SSY | STF | STI | STO | STT | STW |
| SVR | SVV | SZR | TER | THO | TOL | TON | TSC | TUN |
| UEI | UFI | UOS | UOV | UOZ | USI | UTL | UWY | VET |
| VFI | VNI | VSV | WEI | WEN | YUG | ZON | | |

TABLE NO. 2

| Topology codes of tested PSZs that exhibited above average adsorption energies. | | | | | | | | |
|---|---|---|---|---|---|---|---|---|
| AEL | AFG | AFI | AFN | AFO | AFT | AFV | AFX | AST |
| ASV | ATO | AVL | AWW | BEA | BEC | BOF | BOG | BPH |
| BRE | CDO | CGS | CHA | CON | CSV | DDR | DFO | DOH |
| DON | EAB | EEI | ERI | ESV | ETL | ETR | EUO | EZT |
| FAR | FER | GIU | GME | GON | HEU | IFR | IFY | IHW |
| ISV | ITG | ITH | ITN | ITR | IWR | JST | JSW | KFI |
| LAU | LOS | MAZ | MEI | MEL | MER | MFI | MOZ | MRE |
| MSE | MSO | MTF | MTN | MTT | MTW | MWW | NES | NON |
| NPT | OFF | OKO | OSI | OWE | PCR | PHI | PON | POS |
| PSI | PUN | RTE | RUT | SAO | SAT | SBS | SEW | SFG |
| SFS | SGT | SIV | SSO | STI | STT | SVR | SVV | TSC |
| TUN | UFI | UOS | UOV | UOZ | USI | UWY | VET | ZON |

Guided by computational driven screening, a nanoporous PSZ adsorbent was chosen for synthesis to test its ability to remove siloxanes from water. The PSZ adsorbent was a material with a DON phase ("PSZ-DON," see FIG. 2). The PSZ-DON was prepared using bis (~pentamethyl-cyclopentadienyl), cobalt (III) hydroxide ($[(Cp^*)_2Co]OH$) as a structure directing agent (SDA) (Freyhardt et al., 1996). The final PSZ-DON product was a crystalline powder with a chemical framework Composition $[Si_{64}O_{128}]$ besides the SDA. Upon removal of the SDA, the PSZ-DON had a surface area of 400 m $g^{-1}$ and an average pore size of about 12 Å. The PSZ-DON demonstrated thermal stability up to about 600° C.

The PSZ-DON provided advantages over other zeolites based on framework compositional contrast (i.e., an aluminophosphate or aluminosilicates vs. a PSZ). In addition, it could be successfully produced in a pure phase and in amounts required to perform uptake tests. Other materials presented in the results (i.e., FAU and PSI) highlighted the need for a specific type of composition (surface, etc.) in order to achieve the best adsorption amounts. While not wishing to be bound by theory, it appears that structural faulting in DON advantageously leads to the formation of surface silanol sites that also interact selectively with TMS siloxanes.

Figure 3:
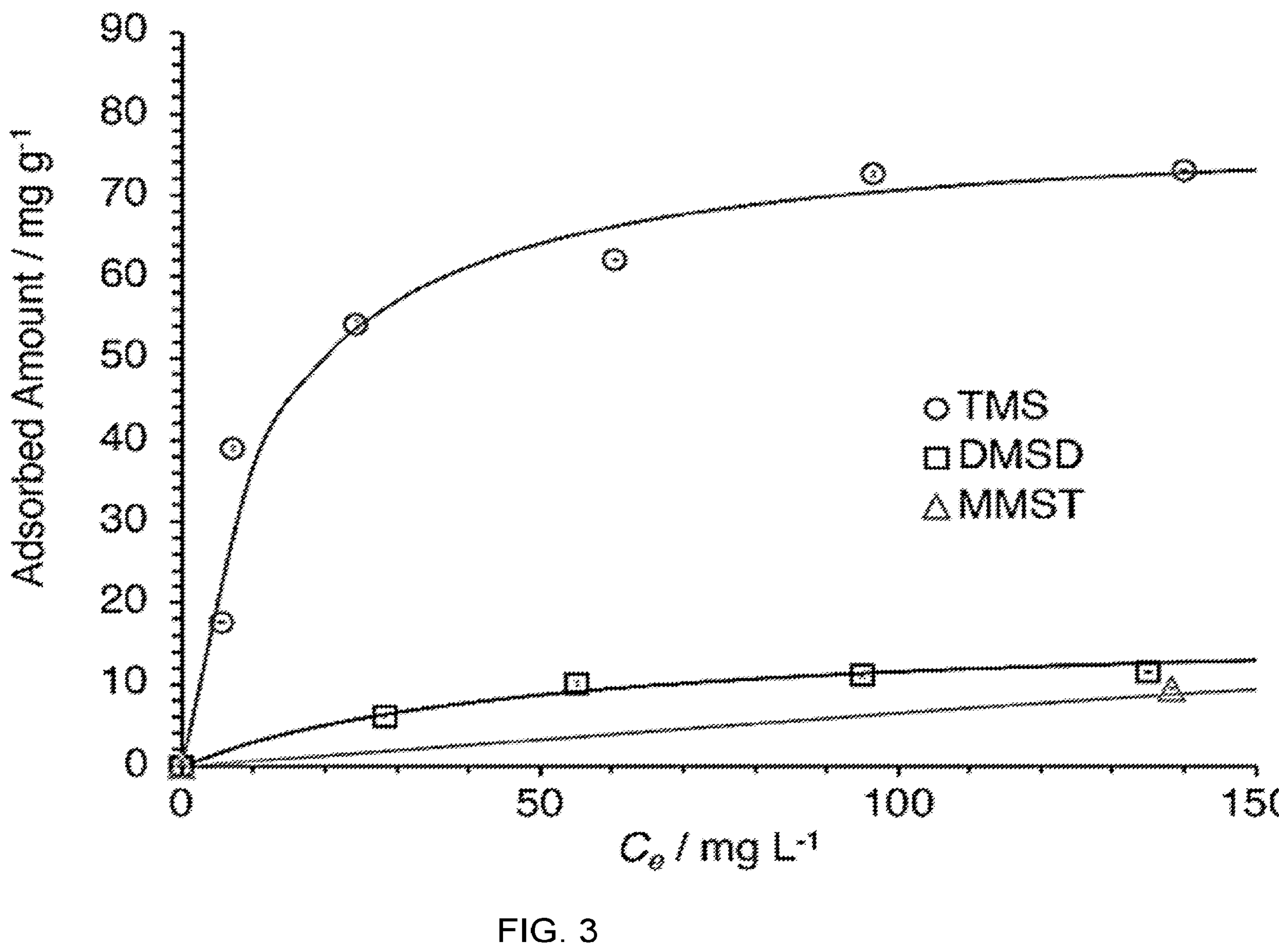
FIG. 3. Single component equilibrium adsorption isotherms for different siloxanes onto a DON PSZ adsorbent. Conditions: ambient temperature and pH~7. Basis: mass (mg) of siloxane adsorbed vs. solution.

FIG. 3 shows single component equilibrium adsorption isotherms for DMSD, MMST, or DMSD onto the PSZ-DON at pH~7 and ambient temperature. The PSZ-DON was capable of removing up to 3 wt. % TMS at saturation, a capacity that is an order of magnitude higher compared to the other tested siloxanes.

Figure 2:
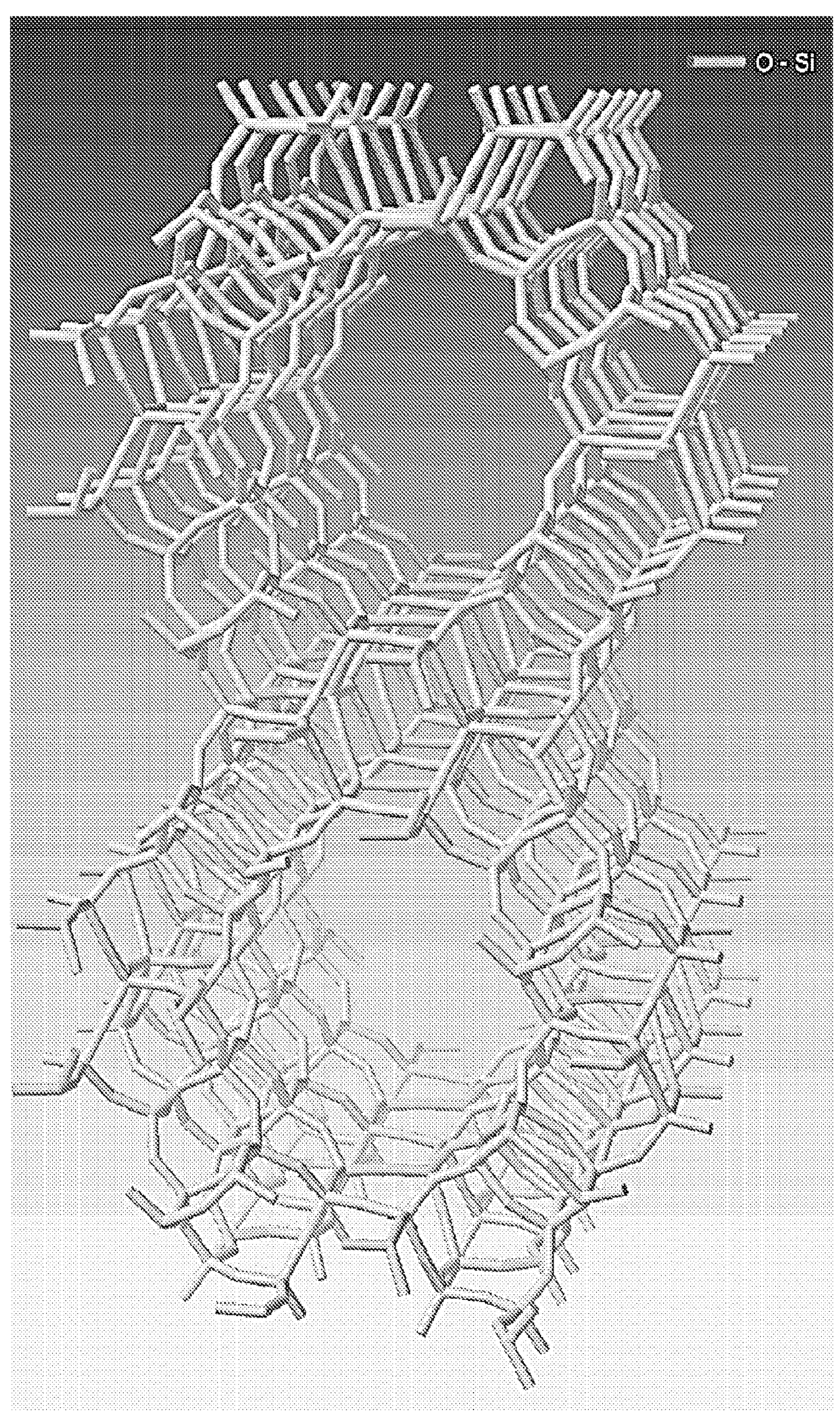
FIG. 2. Illustration of synthesized absorbent with DON framework and pore channels.
Figure 4:
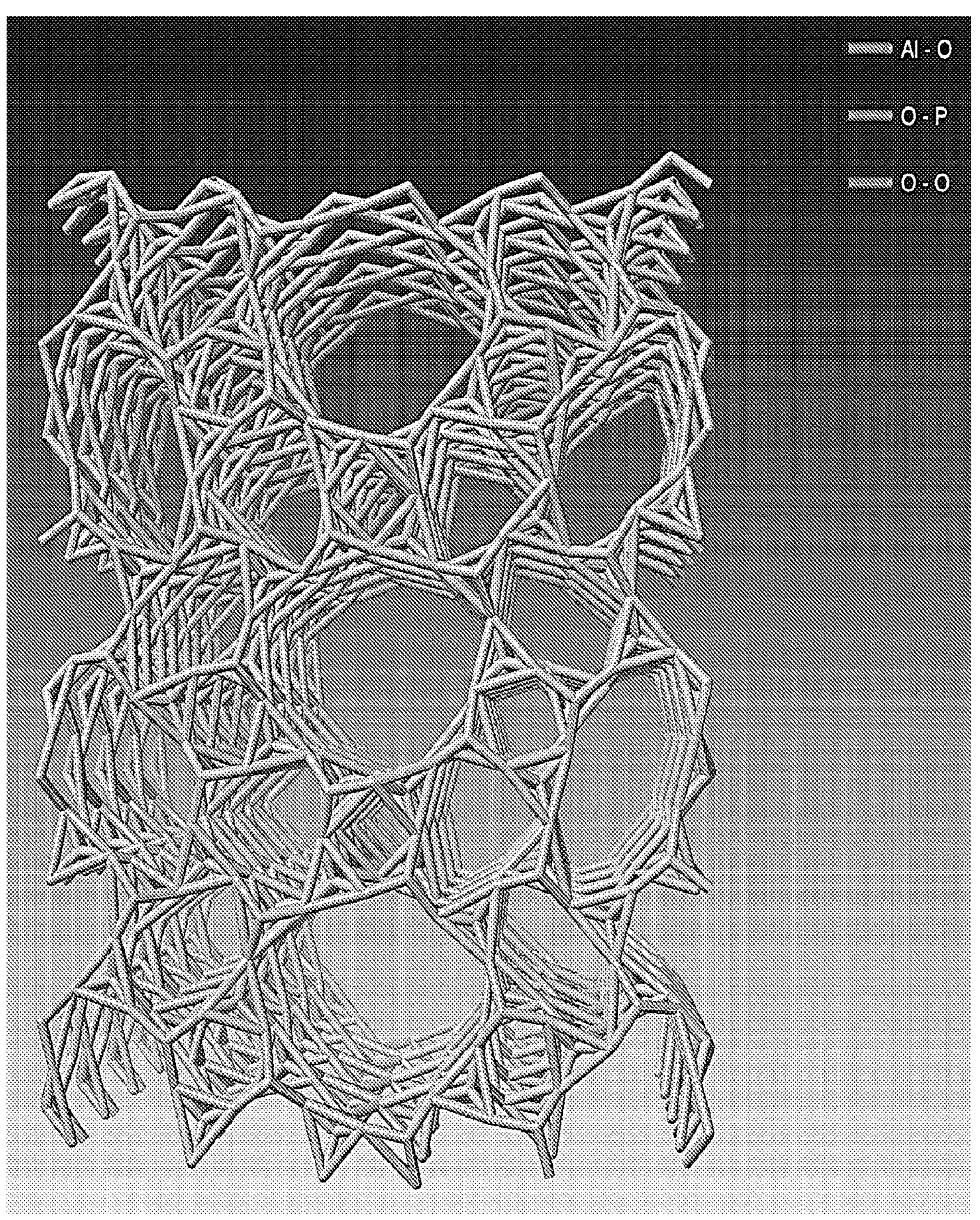
FIG. 4. Illustration of synthesized absorbent with PSI framework and pore channels.
Figure 5:
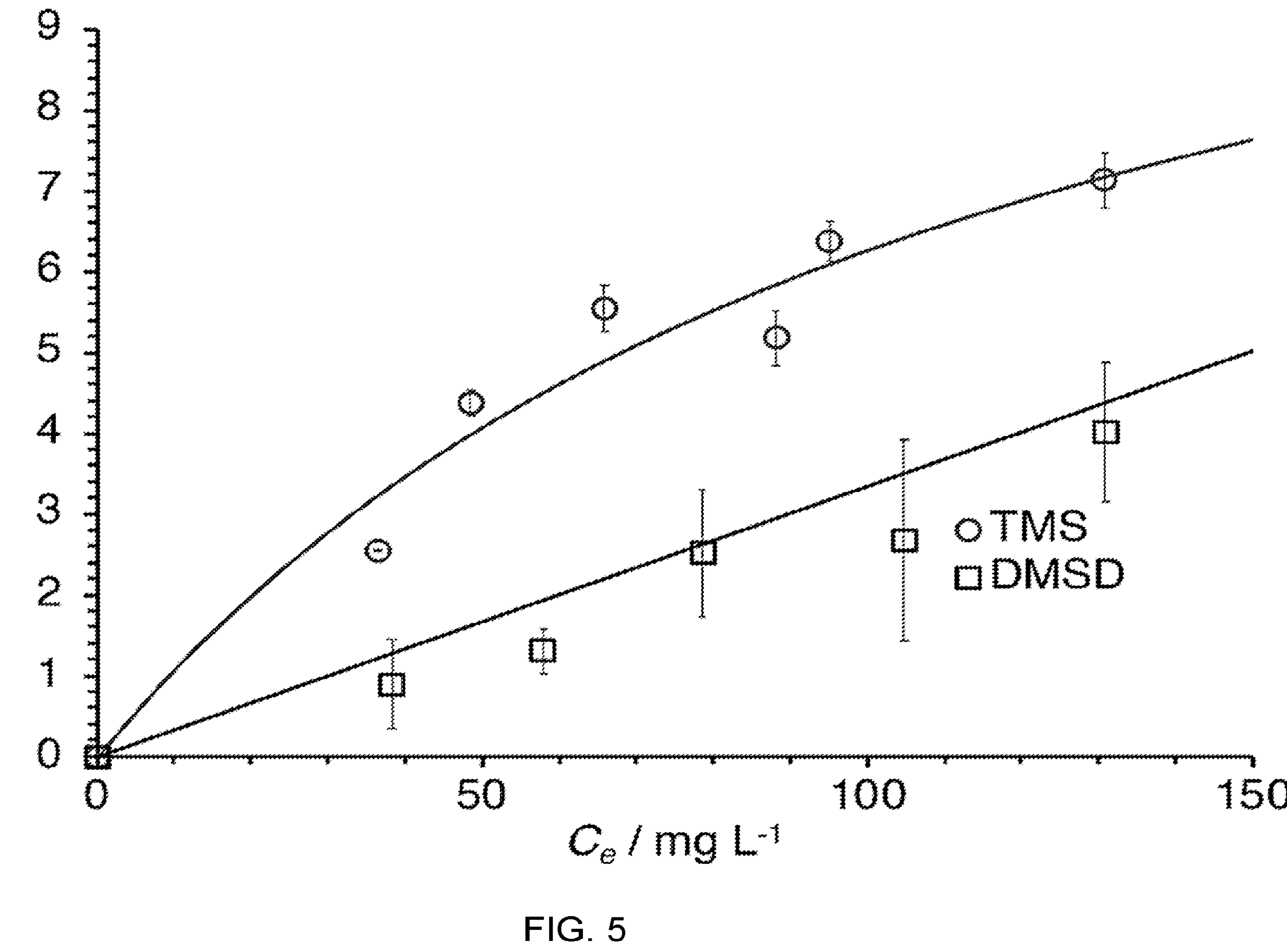
FIG. 5. Single component equilibrium adsorption isotherms for different siloxanes onto a PSI aluminophosphate adsorbent. Conditions: ambient temperature and pH~7. Basis: mass (mg) of siloxane adsorbed vs. solution.

Another adsorbent synthesized and tested was one with a PSI phase ("PSI," see FIG. 4). PSI was prepared in a two step synthesis, the first involving a hydrothermal aging process using diethylamine as a SDA and a second step of thermal treatment crystal transformation at 550° C. (Lee et al., 2014). The resulting material, however, had a framework composition $[Al_{72}P_{72}O_{228}]$ and a surface of 91 $m^2$ $g^{-1}$. FIG. 5 shows single component adsorption isotherms gathered at ambient temperature for PSI. The adsorption capacities are considerable, but not as large as those of PSZ-DON (FIG. 2). The lesser adsorption capacity of PSI is probably due to its aluminum/phosphorus content, which results in a lesser degree of hydrophobicity compared to the silica rich framework of PSZs. Nevertheless, the PSI material has selectivity toward TMS over DMSD.

Figure 6:
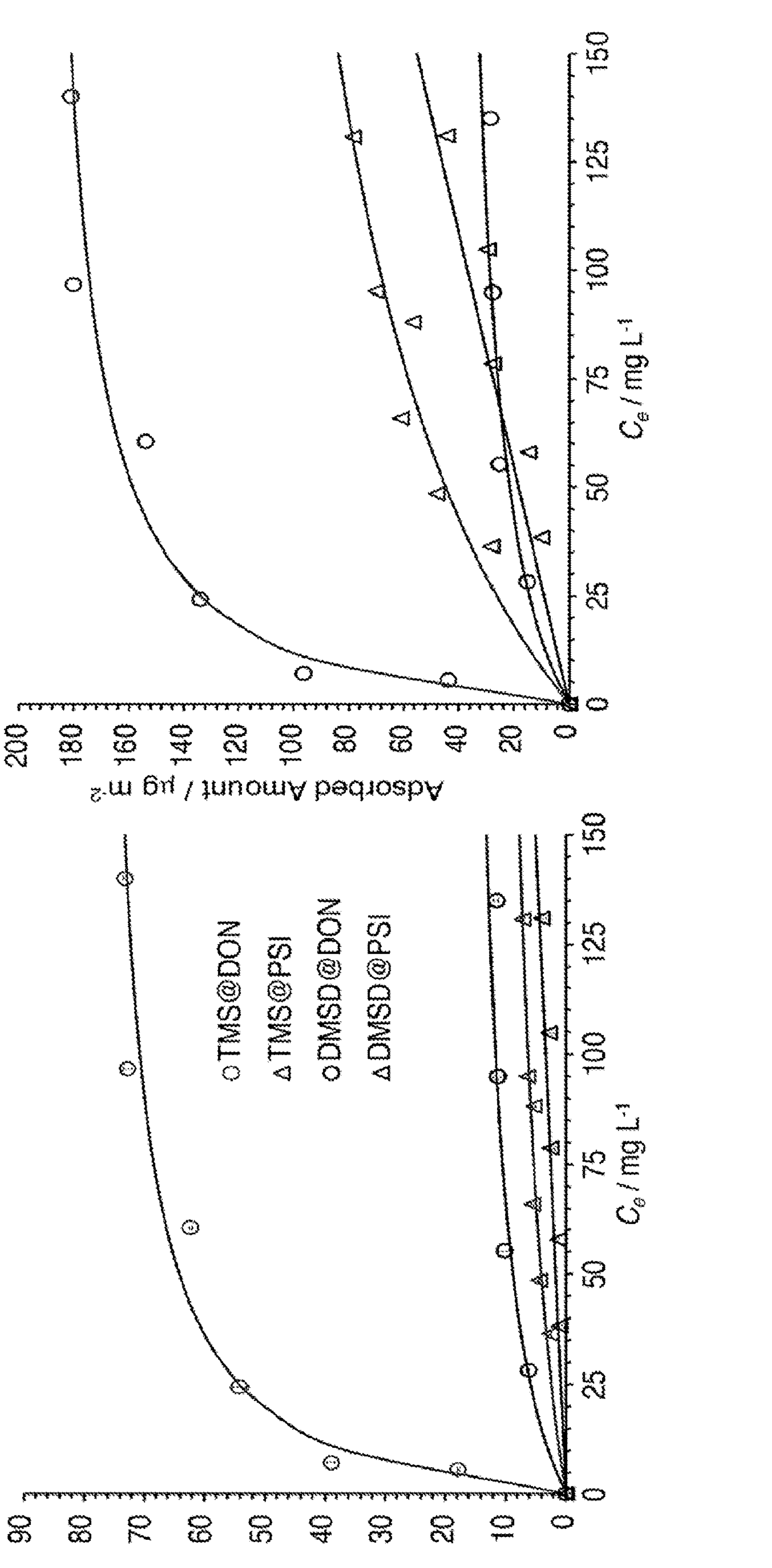
FIG. 6. Comparison of single component equilibrium adsorption isotherms for different siloxanes onto DON PSZ or PSI aluminophosphate adsorbents. (right panel) Ordinate axis in units of mass of siloxane adsorbed per adsorbent surface area. Conditions: ambient temperature and pH~7. Basis: mass (mg) of siloxane adsorbed vs. solution.

A direct comparison of single component adsorption performance of PSZ-DON versus PSI is presented in the adsorption isotherms shown in FIG. 6. Furthermore, the adsorption loadings (ordinate axis) are presented as siloxane mass per adsorbent surface area. These data show that PSI, despite any hydrophobicity limitation due to framework composition, possesses a surface capable of undergoing significant interactions with siloxanes, such as TMS.

Figures 7A, 7B:
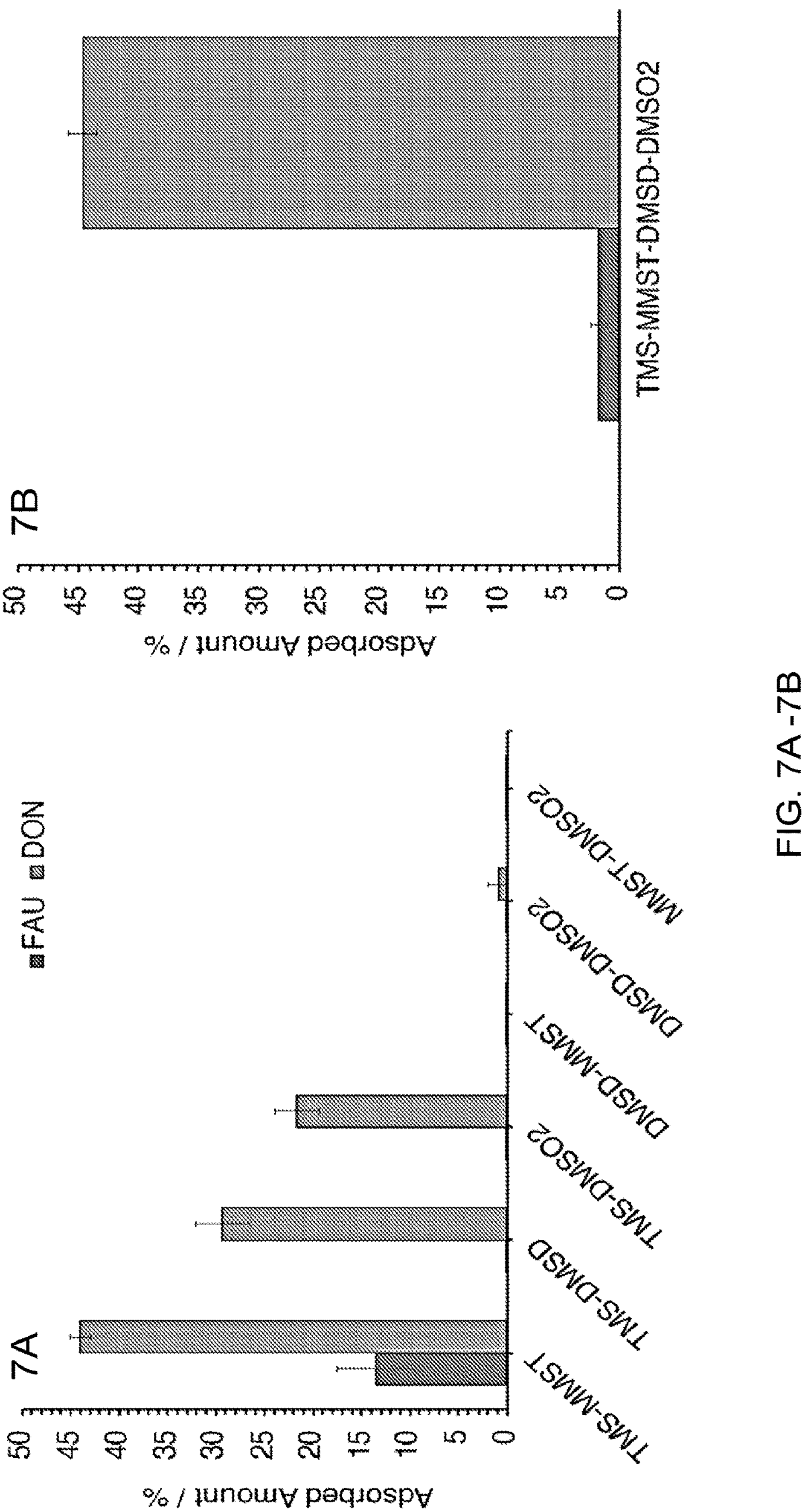
FIGS. 7A and 7B. Single point (A) binary and (B) quaternary mixtures equilibrium uptakes for different siloxanes onto DON PSZ or FAU aluminosilicate adsorbents. Conditions: the initial concentration of each contaminant was 1 mg C L−1, ambient temperature and pH~7.

Evaluation of multi-component adsorption (i.e., simultaneous adsorption of contaminants) was evaluated via single point batch equilibration tests, for aqueous phase solutions containing initially about 1 mg carbon (C) $L^{-1}$ (1 ppm) of each contaminant. $DMSO_2$ was included in these tests, and the data also include a Faujasite zeolite ("FAU") for comparison purposes. FAU has an average pore size of about 7 Å, and its framework includes not only silicon but also aluminum tetrahedra and, therefore, metal cations that balance its structural charge. FIGS. 7A-7B show evidence of co-adsorption, with TMS being the main driving force perhaps because of strong adsorbate-adsorbate interactions. In the case of binary mixtures (FIG. 7A), it is difficult to elucidate how much of the adsorbed amount corresponds to TMS versus the other contaminant (i.e., initial concentration of each adsorbate is 1 mg $CL^{-1}$). However, it is apparent from data gathered for a quaternary mixture of contaminants (FIG. 7B) and that of the binary systems that TMS is perhaps the main contributor to the substantial uptakes via co-adsorption. This is possibly attributable to the strong adsorbate-adsorbate interactions between TMS and other siloxanes.

In general, it appears that a silica-rich surface zeolite is appropriate for the removal of these contaminants and that water containing a mixture of said contaminants could be advantageously treated with a DON adsorbent when TMS is already present in the matrix (i.e., co-adsorption).

The embodiments illustratively described herein suitably can be practiced in the absence of any element or elements, limitation or limitations that are not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the embodiments claimed. Thus, it should be understood that although the present description has been specifically disclosed by embodiments, optional features, modification and variation of the concepts herein disclosed may be resorted to by those skilled in the art, and that such modifications and variations are considered to be within the scope of these embodiments as defined by the description and the appended claims. Although some aspects of the present disclosure can be identified herein as particularly advantageous, it is contemplated that the present disclosure is not limited to these particular aspects of the disclosure.

Claims or descriptions that include "or" between one or more members of a group are considered satisfied if one, more than one, or all of the group members are present in, employed in, or otherwise relevant to a given product or process unless indicated to the contrary or otherwise evident from the context. The disclosure includes embodiments in which exactly one member of the group is present in, employed in, or otherwise relevant to a given product or process. The disclosure includes embodiments in which more than one, or all of the group members are present in, employed in, or otherwise relevant to a given product or process.

Furthermore, the disclosure encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group.

It should it be understood that, in general, where the disclosure, or aspects of the disclosure, is/are referred to as comprising particular elements and/or features, certain embodiments of the disclosure or aspects of the disclosure consist, or consist essentially of, such elements and/or features. For purposes of simplicity, those embodiments have not been specifically set forth in haec verba herein.

REFERENCES

1. Ajhar, M., Travesset, M., Yuce, S., Melin, T., 2010. Siloxane removal from landfill and digester gas—a technology overview. Bioresource technology 101, 2913-2923.
2. Amanathan, R., Ames, J., McCoy, T., 2012. Acceptable levels for ingestion of dimethylsilanediol in water on the International Space Station. Aviat. Space Environ. Med. 83, 598-603.
3. Bletsou, A. A., Asimakopoulos, A. G., Stasinakis, A. S., Thomaidis, N. S., Kannan, K., 2013. Mass loading and fate of linear and cyclic siloxanes in a wastewater treatment plant in Greece. Environmental science & technology 47, 1824-1832.
4. Cabrera-Codony, A., Montes-Morin, M. A., Sinchez-Polo, M., Martin, M. J., Gonzalez-Olmos, R., 2014. Biogas upgrading: optimal activated carbon properties for siloxane removal. Environmental science & technology 48, 7187-7195.
5. Carter, L., Perry, J., Kayatin, M. J., Wilson, M., Gentry, G. J., Bowman, E., Monje, O., Rector, T., Steele, J., 2015a. Process development for removal of siloxanes from ISS atmosphere, 45th International Conference on Environmental Systems. American Institute of Aeronautics and Astronautics, Bellevue, Washington.
6. Carter, L., Perry, J., Kayatin, M. J., Wilson, M., Gentry, G. J., Bowman, E., Monje, O., Rector, T., Steele, J., 2015b. Process Development for Removal of Siloxanes from ISS Atmosphere. 45th International Conference on Environmental Systems.
7. Carter, L., Pruitt, J., Brown, C. A., Schaezler, R., Bankers, L., 2015c. Status of ISS water management and recovery, 45th International Conference on Environmental Systems. American Institute of Aeronautics and Astronautics, Bellevue, Washington.
8. Coggon, M. M., McDonald, B. C., Vlasenko, A., Veres, P. R., Bernard, F. o., Koss, A. R., Yuan, B., Gilman, J. B., Peischl, J., Aikin, K. C., 2018. Diurnal variability and emission pattern of decamethylcyclopentasiloxane (D5) from the application of personal care products in two North American cities. Environmental science & technology 52, 5610-5618.
9. Freyhardt, C. C., Tsapatsis, M., Lobo, R. F., Jr, K. J. B., Davis, M. E., 1996. A high-silica zeolite with a 14-tetrahedral-atom pore opening. Nature 381, 295-298.
10. Genualdi, S., Harner, T., Cheng, Y., MacLeod, M., Hansen, K. M., van Egmond, R., Shoeib, M., Lee, S. C., 2011. Global distribution of linear and cyclic volatile methyl siloxanes in air. Environmental science & technology 45, 3349-3354.
11. Hong, W.-J., Jia, H., Liu, C., Zhang, Z., Sun, Y., Li, Y.-F., 2014. Distribution, source, fate and bioaccumulation of methyl siloxanes in marine environment. Environmental pollution 191, 175-181.
12. Krogseth, I. S., Zhang, X., Lei, Y. D., Wania, F., Breivik, K., 2013. Calibration and application of a passive air sampler (XAD-PAS) for volatile methyl siloxanes. Environmental science & technology 47, 4463-4470.
13. Lee, J.-K., Turrina, A., Zhu, L., Seo, S., Zhang, D., Cox, P. A., Wright, P. A., Qiu, S., Hong, S.-B., 2014. An aluminophosphate molecular sieve with 36 crystallographically distint tetrahedral sites. Angew. Chem. Int. Ed. 53, 1-5.
14. Liu, Y.-H., Meng, Z.-Y., Wang, J.-Y., Dong, Y.-F., Ma, Z.-C., 2019. Removal of siloxanes from biogas using acetylated silica gel as adsorbent. Petroleum Science, 1-9.
15. Olson, D. H., Yang, X., Camblor, M. A., 2004. ITQ-12: a zeolite having temperature dependent adsorption selectivity and potential for propene separation. The Journal of Physical Chemistry B 108, 11044-11048.
16. Ortega, D. R., Subrenat, A., 2009. Siloxane treatment by adsorption into porous materials. Environmental technology 30, 1073-1083.
17. Palomino, M., Cantin, A., Corma, A., Leiva, S., Rey, F., Valencia, S., 2007. Pure silica ITQ-32 zeolite allows separation of linear olefins from paraffins. Chemical Communications, 1233-1235.

18. Pedrouzo, M., Borrull, F., Marce, R. M., Pocurull, E., 2011. Analytical methods for personal-care products in environmental waters. TrAC Trends in Analytical Chemistry 30, 749-760.
19. Pham, T. D., Xiong, R., Sandier, S. I., Lobo, R. F., 2014. Experimental and computational studies on the adsorption of CO2 and N2 on pure silica zeolites. Microporous and Mesoporous Materials 185, 157-166.
20. Rauert, C., Harner, T., Schuster, J. K., Eng, A., Fillmann, G., Castillo, L. E., Fentanes, O., Ibarra, M. N. V., Miglioranza, K. S., I. Moreno Rivadeneira, 2018. Atmospheric concentrations of new persistent organic pollutants and emerging chemicals of concern in the group of latin America and caribbean (GRULAC) region. Environ. Sci. Technol. 52 7240-7249.
21. Rector, T., Metselaar, C., Peyton, B., Steele, J., Michalek, W., Bowman, E., Wilson, M., Gazda, D., Carter, L., 2014. An evaluation of technology to remove problematic organic compounds from the international space station potable water, 44th International Conference on Environmental Systems. American Institute of Aeronautics and Astronautics, Tucson, Arizona.
22. Rutz, J. A., Schultz, J. R., Kuo, C. M., Cole, H. E., Manuel, S., Curtis, M., Jones, P. R., Sparkman, O. D., McCoy, J. T., 2011. Discovery and identification of dimethylsilanediol as a contaminant in ISS potable water, 41st International Conference on Environmental Systems. American Institute of Aeronautics and Astronautics, Portland, Oregon.
23. Sanchez-Brunete, C., Miguel, E., Albero, B., Tadeo, J. L., 2010. Determination of cyclic and linear siloxanes in soil samples by ultrasonic-assisted extraction and gas chromatography-mass spectrometry. Journal of Chromatography A 1217, 7024-7030.
24. Sanchis, J., Cabrerizo, A., Galban-Malagón, C., Barceló, D., Farre, M., Dachs, J., 2015. Unexpected occurrence of volatile dimethylsiloxanes in Antarctic soils, vegetation, phytoplankton, and krill. Environmental science & technology 49, 4415-4424.
25. Sousa, J. V., Mcnamara, P. C., Putt, A. E., Machado, M. W., Surprenant, D. C., Hamelink, J. L., Kent, D. J., Silberhom, E. M., Hobson, J. F., 1995. Effects of octamethylcyclotetrasiloxane (OMCTS) on freshwater and marine organisms. Environ. Toxicol. Chem.: Int. J. 14 1639-1647.
26. Sparham, C., Van Egmond, R., O'Connor, S., Hastie, C., Whelan, M., Kanda, R., Franklin, O., 2008. Determination of decamethylcyclopentasiloxane in river water and final effluent by headspace gas chromatography/mass spectrometry. Journal of Chromatography A 1212, 124-129.
27. Tran, V. T. L., Gelin, P., Ferronato, C., Mascunan, P., Rac, V., Chovelon, J.-M., Postole, G., 2019. Siloxane adsorption on activated carbons: Role of the surface chemistry on sorption properties in humid atmosphere and regenerability issues. Chemical Engineering Journal 371, 821-832.
28. Tuazon, E. C., Aschmann, S. M., Atkinson, R., 2000. Atmospheric degradation of volatile methyl-silicon compounds. Environ. Sci. Technol. 34 1970-1976.
29. Velicogna, J., Ritchie, E., Princz, J., Lessard, M.-E., Scroggins, R., 2012. Ecotoxicity of siloxane D5 in soil. Chemosphere 87, 77-83.
30. Wang, D.-G., Aggarwal, M., Tait, T., Brimble, S., Pacepavicius, G., Kinsman, L., Theocharides, M., Smyth, S. A., Alaee, M., 2015. Fate of anthropogenic cyclic volatile methylsiloxanes in a wastewater treatment plant. Water research 72, 209-217.
31. Wang, X., Schuster, J., Jones, K. C., Gong, P., 2018. Occurrence and spatial distribution of neutral perfluoroalkyl substances and cyclic volatile methylsiloxanes in the atmosphere of the Tibetan Plateau. Atmospheric Chemistry and Physics 18, 8745-8755.
32. Xu, L., Xu, S., Zhi, L., He, X., Zhang, C., Cai, Y., 2017. Methylsiloxanes release from one landfill through yearly cycle and their removal mechanisms (especially hydroxylation) in leachates. Environmental science & technology 51, 12337-12346.
33. Zhi, L., Xu, L., He, X., Zhang, C., Cai, Y., 2018a. Occurrence and profiles of methylsiloxanes and their hydrolysis product in aqueous matrices from the Daqing oilfield in China. Sci. Total Environ. 631 879-886.
34. Zhi, L., Xu, L., Qu, Y., Zhang, C., Cao, D., Cai, Y., 2018b. Identification and elimination of fluorinated methylsiloxanes in environmental matrices near a manufacturing plant in eastern China. Environmental science & technology 52, 12235-12243.
35. Zhu, W., Kapteijn, F., Moulijn, J., Den Exter, M., Jansen, J., 2000. Shape selectivity in adsorption on the all-silica DD3R. Langmuir 16, 3322-3329.

What is claimed is:

1. A nanoporous pure silica zeolite (PSZ) adsorbent, comprising a chemical framework composition comprising $Si_{64}O_{128}$, wherein the nanoporous PSZ adsorbent comprises a DON phase, and wherein the nanoporous PSZ adsorbent comprises an average pore size of about 12 Å.

2. The nanoporous PSZ adsorbent of claim 1 further comprising a surface area in the range of 250 $m^2$ $g^{-1}$ to 600 $m^2$ $g^{-1}$.

3. The nanoporous PSZ adsorbent of claim 1 further comprising thermal stability up to about 600° C.

4. The nanoporous PSZ adsorbent of claim 1, wherein the PSZ adsorbent was prepared using bis(pentamethyl-cyclopentadienyl), cobalt (III) hydroxide $(((Cp^*)_2Co)OH)$ as a structure directing agent.

* * * * *